July 3, 1962 W. S. BUSLIK 3,042,756

ROTATABLE MAGNETIC TRANSDUCER

Filed Dec. 21, 1956 5 Sheets-Sheet 1

INVENTOR.
WALTER S. BUSLIK

BY Campbell, Brumbaugh, Free & Graves his ATTORNEYS

July 3, 1962 W. S. BUSLIK 3,042,756

ROTATABLE MAGNETIC TRANSDUCER

Filed Dec. 21, 1956 5 Sheets-Sheet 2

INVENTOR.
WALTER S. BUSLIK

BY
Campbell, Brumbaugh, Free & Graves his ATTORNEYS

July 3, 1962 W. S. BUSLIK 3,042,756

ROTATABLE MAGNETIC TRANSDUCER

Filed Dec. 21, 1956 5 Sheets-Sheet 3

INVENTOR.
WALTER S. BUSLIK
BY
Campbell, Brumbaugh, Free & Graves
his ATTORNEYS

July 3, 1962 W. S. BUSLIK 3,042,756
ROTATABLE MAGNETIC TRANSDUCER
Filed Dec. 21, 1956 5 Sheets-Sheet 4
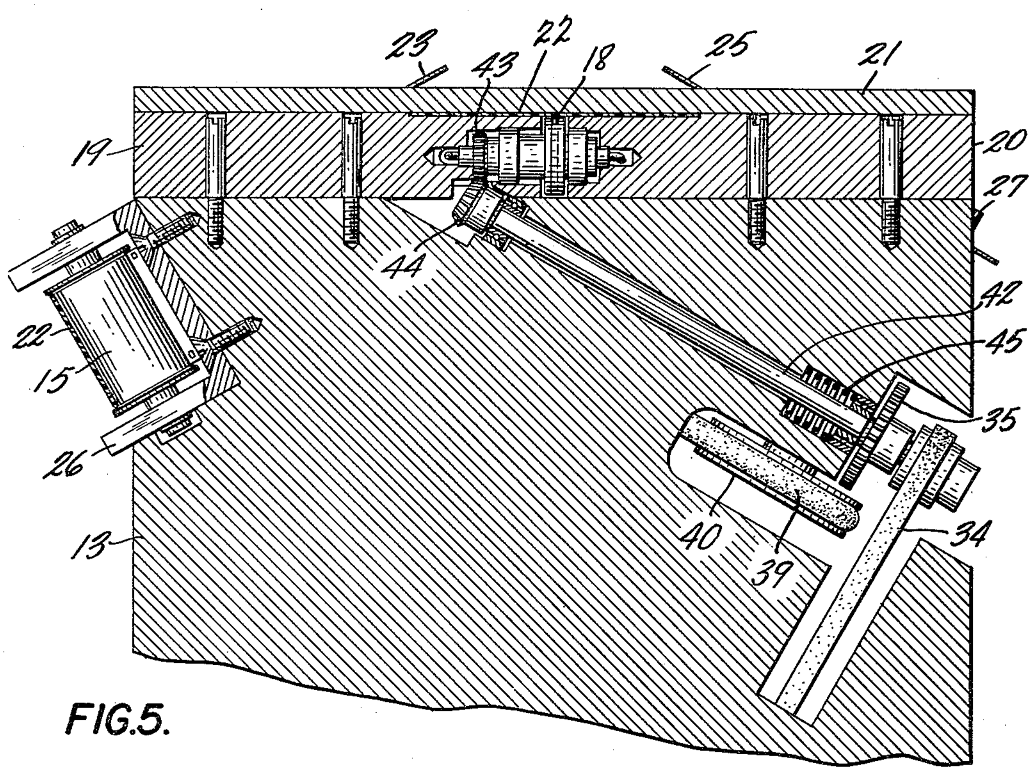
FIG.5.
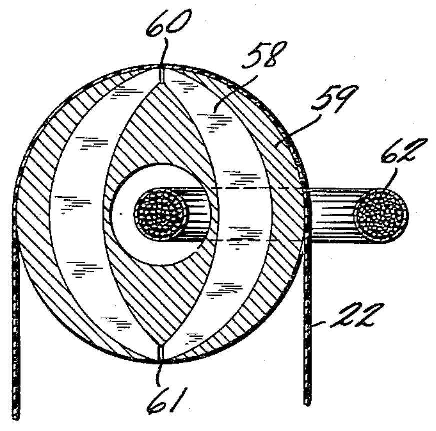
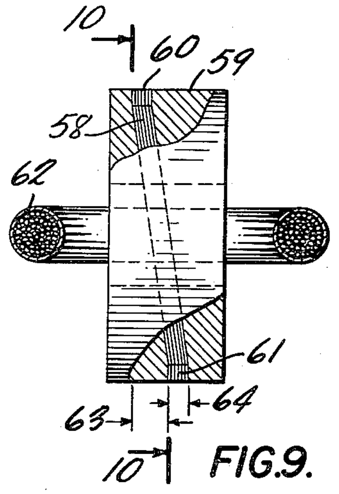
FIG.10. FIG.9.
INVENTOR.
WALTER S. BUSLIK
BY
Campbell, Brumbaugh, Free & Graves
his ATTORNEYS July 3, 1962 W. S. BUSLIK 3,042,756

ROTATABLE MAGNETIC TRANSDUCER

Filed Dec. 21, 1956 5 Sheets-Sheet 5

INVENTOR.
WALTER S. BUSLIK

BY Campbell, Brumbaugh, Free & Graves his ATTORNEYS

United States Patent Office 3,042,756
Patented July 3, 1962

3,042,756
ROTATABLE MAGNETIC TRANSDUCER
Walter S. Buslik, Poughkeepsie, N.Y., assignor to International Business Machines Corporation, New York, N.Y., a corporation of New York
Filed Dec. 21, 1956, Ser. No. 629,812
10 Claims. (Cl. 179—100.2)

This invention relates to magnetic tape systems and, more particularly, to a new and improved magnetic tape system capable of recording and reading short blocks of information on magnetic tape in a highly efficient manner.

In the recording and reading of information on magnetic tape, it is necessary to maintain a high relative velocity between the magnetic transducer and the tape in order to obtain satisfactory reproduction of the recorded information. Magnetic tape systems having a stationary transducer and high tape speed waste a large percentage of tape in the recording of short blocks of information during the time required to accelerate and stop the tape between blocks. In order to avoid this waste and obtain more efficient operation under these conditions, rotating magnetic transducers have been devised to produce the necessary high relative velocity at low longitudinal tape speeds.

Heretofore the coil elements associated with magnetic transducers of this character have been wound on the rotating magnetic core structure, requiring brushes and slip rings to connect the coil windings to external conductors. This introduces a substantial amount of electric noise so that an amplifying stage must be included within the structure of the rotating magnetic head to provide a satisfactory signal. The resulting increase in the inertia of the rotating head offsets the advantage of the rotary construction by increasing the time required to accelerate and stop the system.

It is an object of this invention, accordingly, to provide new and improved means for recording short blocks of information on magnetic tape in a highly efficient manner.

Another object of the invention is to provide a tape drive system of the above character capable of being accelerated and stopped in minimum time.

A further object of the invention is to provide a novel rotating magnetic transducer for recording and reading information on tape without internal amplification.

Still another object of the invention is to provide a magnetic tape system capable of reading back recorded information immediately after the record has been made.

These and other objects of the invention are attained by providing a magnetic transducer having rotating magnetic conducting means flux-linked to a stationary coil member. More particularly, the magnetic transducer includes a rotatably mounted annular ring of magnetic conducting material constructed with at least one air gap. A coil passing through the center of the ring is flux-linked to it so that variations in the magnetic field within the ring induce electrical signals in the coil. The transducer is positioned at an angle to the direction of tape motion so that the air gap sweeps diagonally across the tape at a high relative speed while the tape is transported at low speed.

The rotating magnetic head may also be constructed with two diametrically opposed air gaps axially displaced by a distance equal to the longitudinal travel of the tape during one-half revolution so that the two gaps trace the same path across the tape. Thus, a record may be made through one gap and read back through the second immediately thereafter.

Further objects and advantages of the invention will be apparent to those skilled in the art from a reading of the following description taken in conjunction with the accompanying drawings in which:

FIG. 5 is a sectional view taken along the line 5—5 of FIG. 4;

FIG. 9 is a partial view illustrating another embodiment of the rotating magnetic head of the invention; and FIG. 10 is a sectional view taken along the line 10—10 of FIG. 9.

Figures 1, 2:
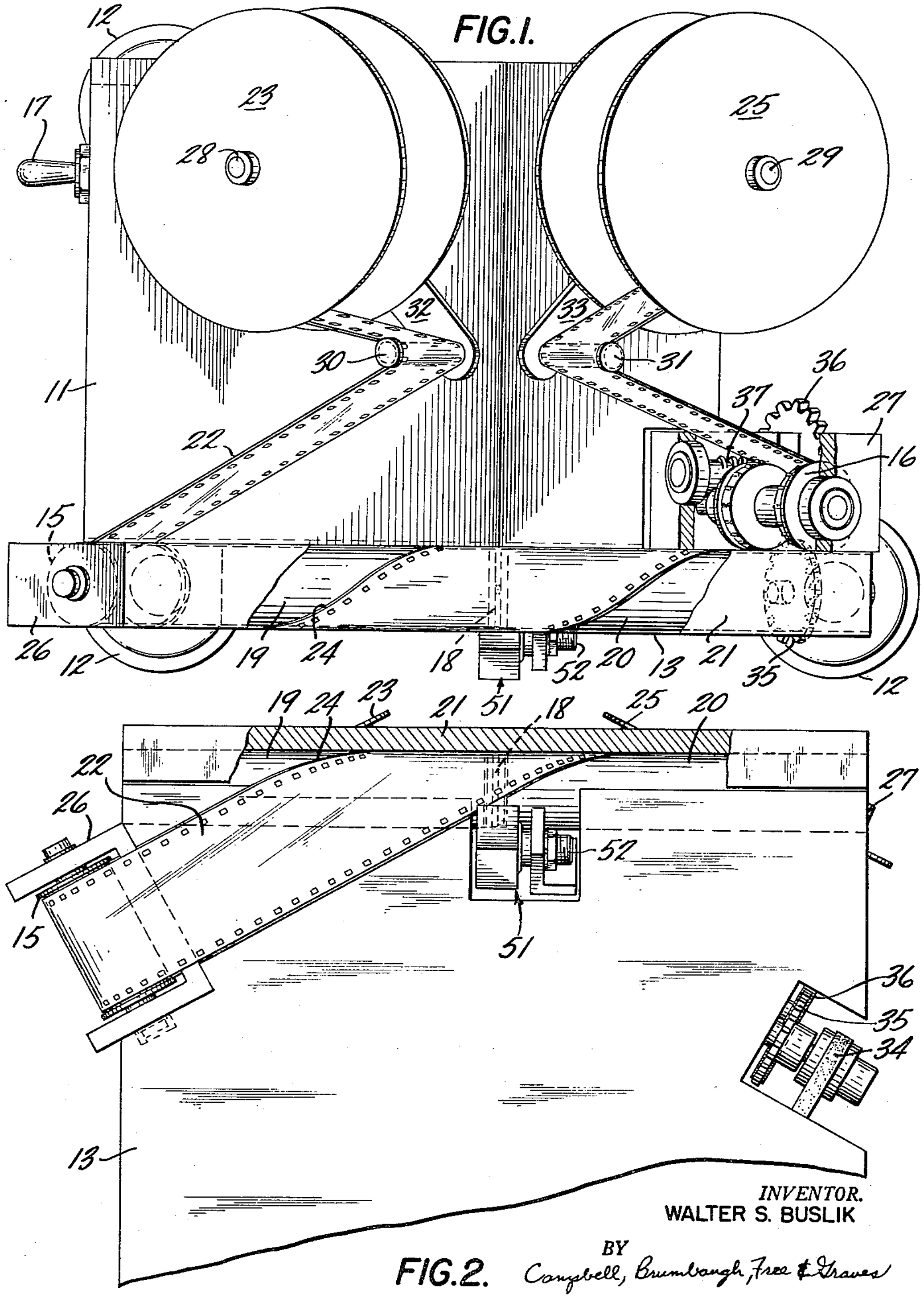
FIG. 1 is a plan view of a typical magnetic tape apparatus constructed according to the invention.
FIG. 2 is a partial front elevation of the apparatus shown in FIG. 1.
Figure 3:
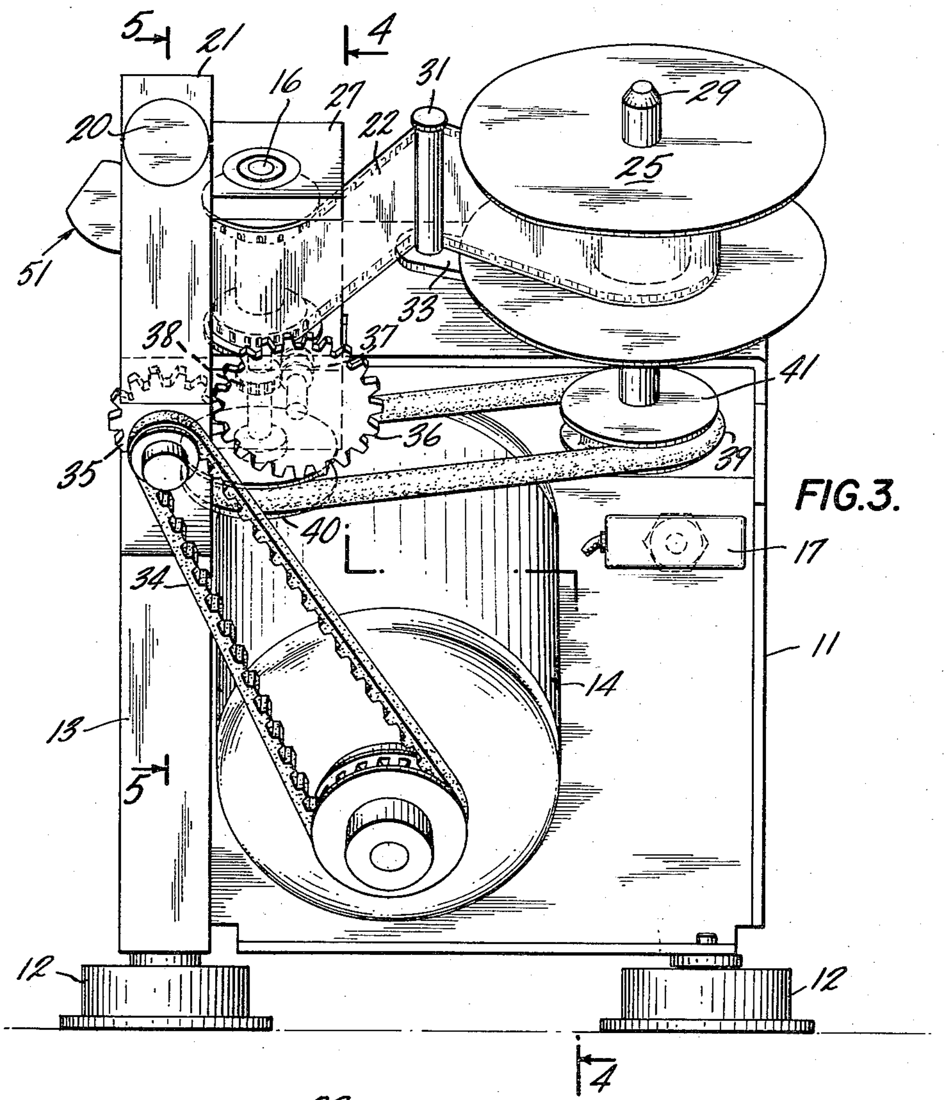
FIG. 3 is a side view in elevation of the apparatus of FIG. 1.

Referring first to FIGS. 1 through 4, the novel magnetic tape apparatus comprises a housing 11 supported at its base on four feet 12 and having as its front wall a vertical support plate 13 on which an electric motor 14, an idler roller 15 and a tape drive sprocket 16 are mounted. A switch 17, mounted in the side of the housing 11, controls the operation of the motor 14. At the top of the support plate 13 a magnetic head 18 is rotatably mounted between two cylindrical stationary guides 19 and 20, a magnetic shield 21 being located above the guides to enclose the magnetic head.

Perforated magnetic tape 22 from a tape supply spool 23 is directed by the roller 15 through a helical groove 24 cut in the guides 19 and 20 and fed to a take-up spool 25 by the sprocket 16. The groove 24 carries the tape past the cylindrical magnetic head 18 in a helical manner so that the top half of the head is in magnetic contact with a semicircle of tape, the shield 21 enclosing the tape and retaining it in spiral form within the groove 24.

In order to direct the tape properly through the helical groove 24, the roller 15 and sprocket 16 are rotatably mounted in two outwardly tilted brackets 26 and 27, the tape spools 23 and 25 being supported on two studs 28 and 29 similarly angled on the top surface of the housing 11. Two tilted rollers 30 and 31, supported on spring biased arms 32 and 33, maintain tension on the tape loops between the idler 15 and the spool 23 and between the sprocket 16 and the spool 25, respectively.

The motor 14 powers the tape drive system through a belt 34 and two gears 35 and 36, the gear 36 being connected through a worm 37 to the drive sprocket shaft 38. Another belt 39 connects a pulley 40 on the shaft 38 with a second pulley 41 mounted at the lower end of the stud 29 to drive the take-up spool 25. As illustrated in FIG. 5, the gear 35 is mounted on a shaft 42 which extends at an angle through a hole in the support plate 13 and carries rotary motion to the magnetic head 18 through two bevel gears 43 and 44. An axial spring 45 may be provided on the shaft 42 to remove end play, if desired.

The ratio of the gears 35, 36, 43 and 44 and the worm 37 is arranged to produce a high relative speed between the head 18 and the tape 22. In practice, a rotational head speed of about 6,000 r.p.m. and a linear tape speed of about six and one-quarter inches per second have been found to be satisfactory.

Figures 6, 7:
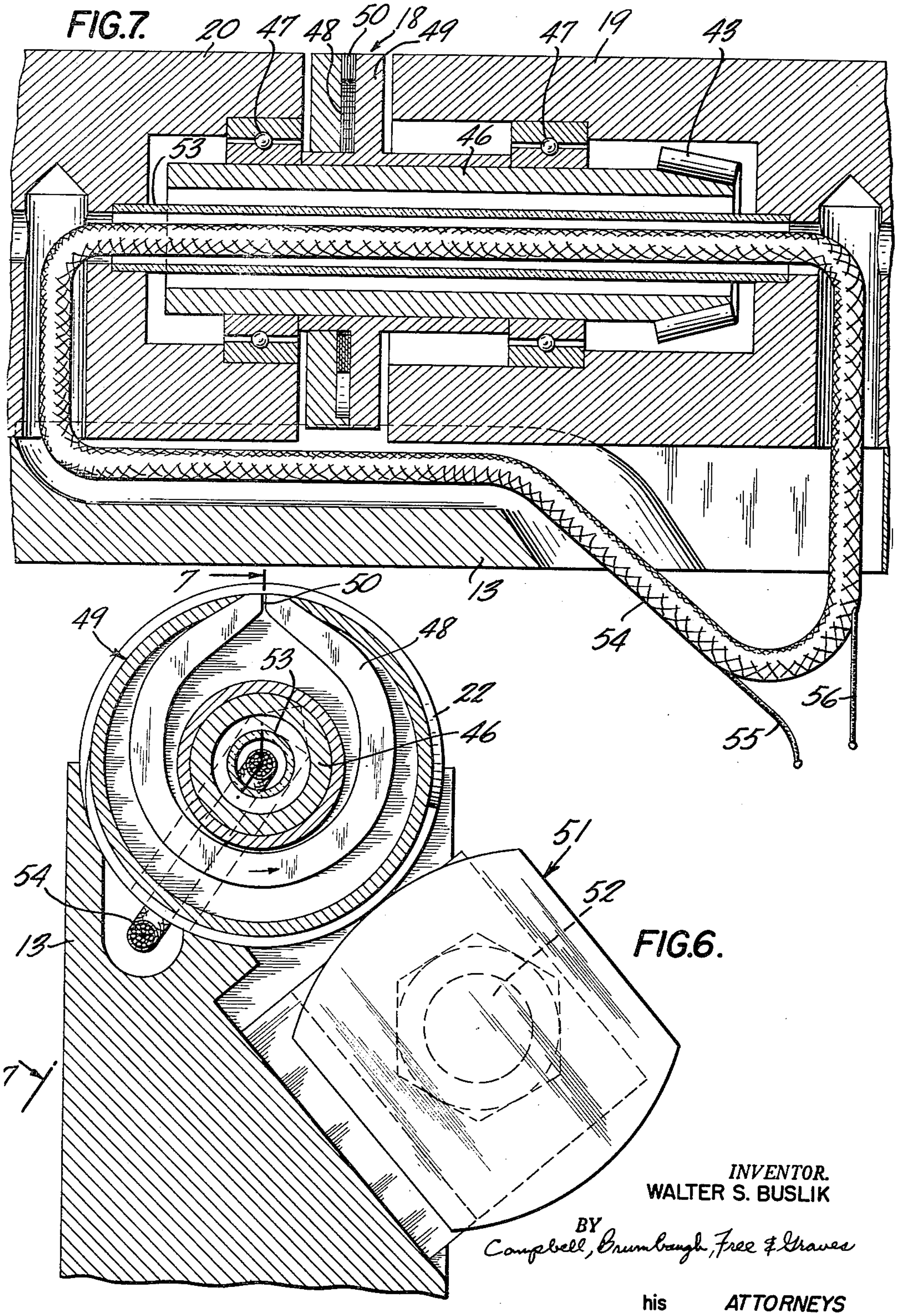
FIG. 6 is an enlarged sectional view illustrating the structure of the rotating magnetic head, taken along the line 6—6 of FIG. 4.
FIG. 7 is a sectional view taken along the line 7—7 of FIG. 6.

One embodiment of the rotating head 18 is illustrated in detail in FIGS. 6 and 7 wherein it will be seen that a hollow cylinder 46, rotatably supported in two bearings 47, carries the bevel gear 43. In addition, an annular ring of laminated magnetic material 48, embedded in a cylindrical envelope 49 of monmagnetic material and having an air gap 50 located at the periphery of the envelope, is mounted on the cylinder 46 between the bearings 47. As best seen in FIG. 2, the separation of the two cylindrical guides 19 and 20 may be altered by an adjusting device 51, controlled by a screw 52, to eliminate end play between the two bearings 47.

Passing through the center of the cylinder 46 is a tube 53 carrying one arm of a sensing coil 54, the remainder of the coil completing a circuit through openings in the guides 19 and 20 and the support plate 13. External circuitry (not shown) may be connected to the coil through two conductors 55 and 56 brought out through an opening in the plate 13. To insure optimum operation of the present system, it is desirable to provide maximum magnetic shielding around the head 18 and the coil 54 and to avoid the use of magnetic parts, other than the annular ring 48, in the structure of the rotating head.

Figure 8:
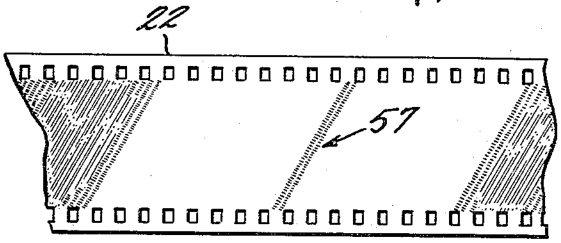
FIG. 8 is an illustration of a portion of magnetic tape showing the arrangement of the record tracks produced by the apparatus of the invention.
Figure 4:
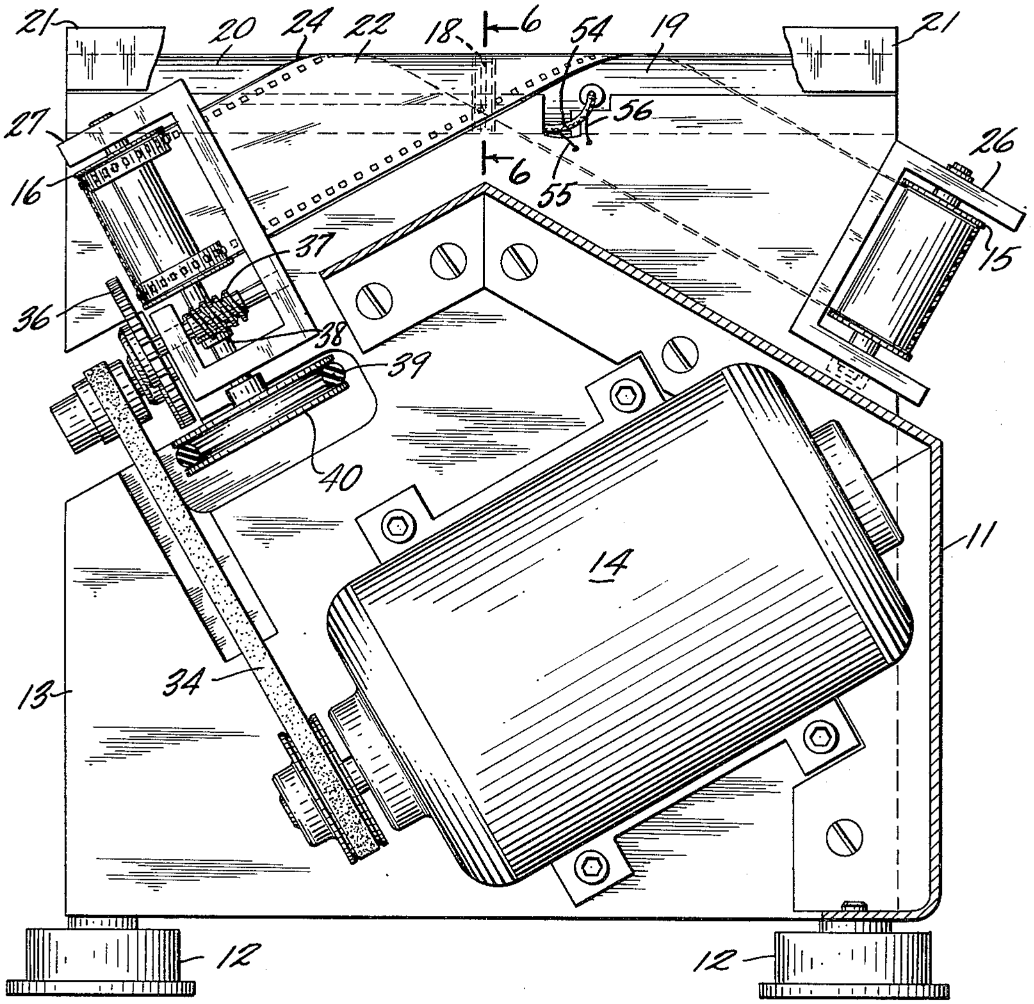
FIG. 4 is a rear elevation, partially in section, taken along the line 4—4 of FIG. 3.

In operation, the motor 14 drives the sprocket 16, the take-up spool 25 and the rotating head 18 through the connections described above. When an electrical information signal is impressed on the coil 54 through the conductors 55 and 56 it induces changes in the magnetic field at the air gap 50 because of the flux-linkage between the coil and the head. This produces a series of diagonal record tracks 57 on the magnetic tape 22, as illustrated in FIG. 8. Each of these tracks contains information recorded during the half revolution of the head 18 when the air gap 50 was in magnetic contact with the tape, the diagonal arrangement resulting from the helical shape of the tape with respect to the head.

Because of its low inertia, a rotating magnetic head of the type described above is capable of being accelerated or stopped within one-quarter revolution. Thus, each of the tracks 57 may represent an independent block of information recorded during one revolution of the head 18. If thirty-five millimeter tape is utilized in the apparatus it is possible to record independent eighty-character blocks of information on adjacent tracks spaced, for example, by one-sixteenth of an inch, completely eliminating the former waste of tape between such blocks.

In order to read back the recorded information the two conductors 55 and 56 are switched to a conventional signal reproducing device (not shown) and the tape is again passed through the apparatus. Inasmuch as the sprocket 16 and the head 18 are mechanically linked in a fixed ratio, the gap 50 will again sweep across the tape in alignment with each of the magnetic record tracks to reproduce the information recorded therein.

Another embodiment of the rotating magnetic head, illustrated in FIGS. 9 and 10, comprises an oval-shaped magnetic conducting ring 58 embedded in a cylindrical envelope 59 and having two diametrically opposed air gaps 60 and 61 at the periphery of the envelope. A coil 62 passing through the axis of the head is flux-linked to it and the tape 22 is held around the head in a helical manner as in the embodiment described above. With this arrangement it will be observed that if the tape speed is doubled to maintain the proper track separation, information may be recorded continuously, one of the gaps being in magnetic contact with the tape at all times as the head is rotated.

If desired, the magnetic ring 58 may be tilted on its axis to displace the gaps 60 and 61 by an axial distance 63 equal to half the separation of the adjacent tracks 57 (FIG. 8) on the tape. As a result the two gaps will trace the same path across the tape in succession. By arranging the associated circuitry to read in while the first gap crosses the tape and read out while the following gap crosses in the same path, an immediate playback of the recorded information may be obtained. In order to make certain that the magnetic field at the following gap 61 remains within the confines of the record track, the thickness 64 of the magnetic ring 57 at that gap may be less than at the leading gap 60, as shown in FIG. 9.

It will be readily apparent from the above description that the invention provides a novel tape system for handling short blocks of information economically wherein the information recorded may be played back immediately.

Although specific embodiments of the invention have been described and illustrated, various modifications and changes therein will be obvious to those skilled in the art. Accordingly, the scope of the invention is not intended to be restricted except as defined in the appended claims.

I claim:

1. A magnetic transducer comprising rotatably mounted magnetic conducting means, said means comprising the sole magnetic circuit which circuit is closed except for a central aperture and at least one magnetic recording and reproducing gap and stationary coil means passing through the central aperture and surrounding a portion of the path of motion of the magnetic conducting means.

2. A magnetic transducer comprising a rotatably mounted substantially annular member made of magnetic material, said member comprising the sole magnetic circuit which circuit is closed except for at least one recording and reproducing gap and a stationary coil passing through the member and surrounding a portion of the path of motion of the member and surrounding the path of motion of the ring.

3. A magnetic transducer comprising a substantially annular member made of magnetic material, said member comprising the sole magnetic circuit which circuit is closed except for at least one recording and reproducing gap embedded in a rotatably mounted cylinder of nonmagnetic material with the gap at the periphery of the cylinder and a stationary coil passing through the cylinder and surrounding a portion of the path of motion of the member.

4. A magnetic transducer comprising a rotatably mounted substantially annular ring of magnetic material having two gaps displaced in opposite directions from a plane perpendicular to the axis of rotation of the ring by an amount greater than half the axial length of each gap and stationary coil means flux-linked thereto.

5. A magnetic transducer comprising a rotatably mounted substantially annular ring of magnetic material having two diametrically opposed gaps, one of said gaps being slightly shorter in the axial direction than the other, said gaps being displaced in opposite directions from a plane perpendicular to the axis of rotation of the ring by an amount greater than half the axial length of the longest gap, and stationary coil means flux-linked thereto.

6. Magnetic tape apparatus comprising a magnetic transducer including rotatably mounted magnetic conducting means, said means comprising the sole magnetic circuit which circuit is closed except for a central aperture and at least one magnetic recording and reproducing gap and stationary coil means surrounding a portion of the path of motion of the magnetic conducting means and passing through the aperture, tape guiding means to position magnetic tape around the transducer so that the gap moves across the tape in a diagonal direction when the transducer is rotated, and driving means to rotate the transducer and move the tape in a longitudinal direction simultaneously.

7. Magnetic tape apparatus comprising a magnetic transducer including rotatably mounted magnetic conducting means, said means comprising the sole magnetic circuit which circuit is closed except for a central aperture and at least one magnetic recording and reproducing gap and stationary coil means surrounding a portion of the path of motion of the magnetic conducting means and passing through the aperture, tape guiding means to position magnetic tape in a helical shape around the transducer so that the gap moves across the tape in a diagonal direction when the transducer is rotated, and driving means to rotate the transducer and move the tape in a longitudinal direction in fixed relation.

8. Magnetic tape apparatus comprising a magnetic transducer including a substantially annular magnetic ring having at least one gap embedded in a rotatably mounted cylinder of nonmagnetic material and stationary coil means flux-linked thereto, tape guiding means surrounding the cylinder having a helical slot to position magnetic tape in a helical form around the cylinder and retain it in magnetic contact therewith, whereby the gap moves across the tape in a diagonal direction when the transducer is rotated, sprocket means for driving the tape in a longitudinal direction, said sprocket means and said transducer being connected to rotate in fixed relation, and driving means to rotate the sprocket means and the transducer.

9. Magnetic tape apparatus comprising a rotatably mounted magnetic transducer including a substantially annular ring of magnetic material having two diametrically opposed gaps, stationary coil means flux-linked thereto, tape guiding means to position magnetic tape in a helical shape around the transducer so that the tape is held in magnetic contact therewith throughout approximately one-half its periphery, means for driving the tape in a longitudinal direction, said tape driving means and said transducer being connected to rotate in fixed relation, whereby the two gaps trace successive diagonal lines across the tape as the transducer rotates, and means to rotate the tape driving means and the transducer.

10. Magnetic tape apparatus comprising a rotatably mounted magnetic transducer including a substantially annular ring of magnetic material having two diametrically opposed gaps displaced in opposite directions from a plane perpendicular to the axis of rotation of the ring, stationary coil means flux-linked thereto, tape guiding means to position magnetic tape in a helical shape around the transducer so that the tape is in magnetic contact therewith throughout approximately one-half its periphery, sprocket means for driving the tape in a longitudinal direction, said sprocket means and said transducer being connected to rotate in fixed relation, the displacement of the two gaps being related thereto so that one gap traces successive diagonal paths across the tape and the other follows in the same paths as the transducer is rotated, and driving means to rotate the sprocket means and the transducer simultaneously.

References Cited in the file of this patent

UNITED STATES PATENTS

| | | |
|---|---|---|
| 586,825 | Perret | July 20, 1897 |
| 2,193,531 | Esval | Mar. 12, 1940 |
| 2,245,286 | Marzocchi | June 10, 1941 |
| 2,648,589 | Hickman | Aug. 11, 1953 |
| 2,773,120 | Masterson | Dec. 4, 1956 |
| 2,854,525 | Quade | Sept. 30, 1958 |
| 2,909,616 | Marty | Oct. 20, 1959 |
| 2,919,314 | Holt | Dec. 29, 1959 |

FOREIGN PATENTS

| | | |
|---|---|---|
| 1,107,292 | France | Aug. 3, 1955 |
| 935,937 | Germany | Dec. 1, 1955 |